United States Patent

[11] 3,633,931

| [72] | Inventor | Otto Bilz<br>73 Esslingen, Waldackerweg 8, Germany |
|---|---|---|
| [21] | Appl. No. | 36,580 |
| [22] | Filed | May 12, 1970 |
| [45] | Patented | Jan. 11, 1972 |

[54] QUICK-CHANGE CHUCKS
4 Claims, 4 Drawing Figs.

[52] U.S. Cl................................................ 279/75,
279/30, 279/1 B
[51] Int. Cl.................................................. B23b 31/22,
B23b 31/10
[50] Field of Search........................................ 279/1 B, 1
M, 30, 75

[56] References Cited
UNITED STATES PATENTS
2,926,020  2/1960  Dayton et al. ................  279/75

*Primary Examiner*—Francis S. Husar
*Attorney*—Craig, Antonelli, Stewart & Hill

ABSTRACT: A quick-change chuck for a machine tool in which by means of only one hand the operator may insert a toolholding socket with an adjusting nut thereon into a shank and lock the same to the shank by means of locking balls engaging into a peripheral groove in the adjusting nut and may also with the same hand release the locking balls from the adjusting nut and withdraw the tool socket with the adjusting nut from the shank.

PATENTED JAN 11 1972

3,633,931

INVENTOR
Otto BILZ

BY
Craig, Antonelli Stewart & Hill
ATTORNEYS

QUICK-CHANGE CHUCKS

The present invention relates to improvements in a quick-change chuck for a machine tool which generally comprises a hollow cylindrical shank, a tool socket which is adapted to be inserted into the shank and to hold a tool, an adjusting nut which is provided with an outer peripheral groove and adapted to be screwed upon the threaded front end of the socket for adjusting the same to different positions in the longitudinal direction of the shank, locking balls which are guided in transverse bores in the shank or in a part which is secured to the shank, and a control sleeve which surrounds and is slidable along the shank and adapted by a movement in one direction to press the locking balls radially inwards so as partly to project from their guide bores into the peripheral groove to lock the adjusting nut to the shank and, by a movement in the opposite direction, to release the locking balls from the nut so as to permit the adjusting nut together with the tool socket to be withdrawn from the shank.

The known kinds of quick-change chucks of the above-mentioned type have the disadvantage that for these inserting, locking, releasing and withdrawing operations the operator of the machine tool is required to employ both hands, namely, one hand for manipulating the control sleeve and the other hand at the same time for inserting or withdrawing the tool socket together with the adjusting nut.

It is an object of the present invention to provide a quick-change chuck of the general type as previously described which is designed so as to require only one hand for inserting the tool socket and adjusting nut into the shank and locking the adjusting nut to the shank and also for releasing the adjusting nut and withdrawing the same together with the tool socket from the shank.

According to the invention this object is attained by providing the outer wall of the front end of the shank which is surrounded by the control sleeve with at least two diametrically opposite longitudinal grooves and by inserting a connecting bar into each of these grooves so as to be slidable longitudinally therein. These connecting bars, each of which has a transverse projection extending radially outwards from the bar and a longitudinal extension at a right angle to the transverse projection, are adapted to connect the adjusting nut to the control sleeve for transmitting from one of these elements to the other the longitudinal movement which is manually exerted at one time upon the adjusting nut in one direction and at another time upon the control sleeve in the opposite direction for the purpose of locking the adjusting nut to the shank or for releasing this nut from the shank.

When the tool socket together with the adjusting nut is being inserted into the shank, the inner end surface of the nut presses against the longitudinal extensions of the connecting bars and shifts the latter toward the rear. The transverse projections on the connecting bars then transmit this movement via an axially slidable pressure ring to the compression spring of the control sleeve which is thereby compressed and shifted toward the rear and, in turn, shifts the control sleeve toward the rear along the shank. Since by the rearward movement of the adjusting nut the peripheral groove of the latter is shifted substantially to the same plane in which the locking balls are slidable in radial guide bores in the front part of the shank, the control sleeve will, by its rearward movement, press the locking balls radially inwards within their guide bores so as to project from these bores into the peripheral groove in the adjusting nut so that the latter will be locked against any longitudinal movement relative to the shank. Therefore, for inserting the tool socket together with the adjusting nut into the shank and for locking this nut to the shank only one hand is required.

For releasing the locking balls from the adjusting nut so as to permit this nut together with the tool socket to be withdrawn from the shank, it is only necessary to grip the control sleeve with one hand and to shift it along the shank forwardly to a position in which one or more recesses in the inner wall of the front part of the control sleeve are in alignment with the locking balls which are located in their guide bores and partly project into the peripheral groove of the adjusting nut. Since this forward movement of the control sleeve is also transmitted by the compression spring and the pressure ring to the transverse projections of the connecting bars, the longitudinal extensions of the latter will press against the inner end surface of the adjusting nut, whereby the latter is shifted longitudinally which causes the locking balls to be forced radially outwards and out of the peripheral groove so that, by the further forward movement of the control sleeve, the longitudinal extensions of the connecting bars will push the adjusting nut forwardly away from the locking balls. By then releasing the control sleeve and gripping the adjusting nut with the same hand, this nut together with the tool socket may be entirely withdrawn from the shank.

It is therefore evident that the operator of the machine tool may carry out all of the manipulations which are necessary for operating the quick-change chuck according to the invention very easily and quickly with only one hand, permitting him to use his other hand to do any other work.

These and additional features and advantages of the present invention will become further apparent from the following detailed description thereof which is to be read with reference to the accompanying drawings, in which:

FIG. 3 shows a cross section which is taken along the line A—A of FIG. 1; while

Figure 1:
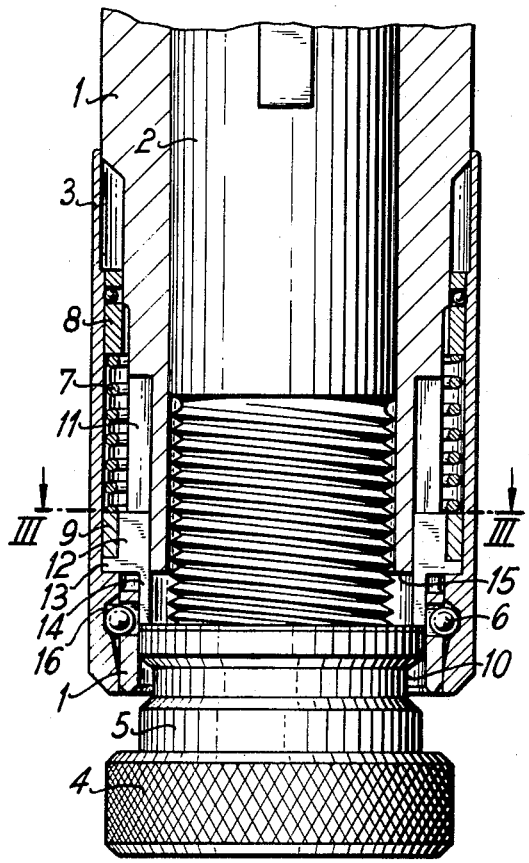
FIG. 1 shows a longitudinal section of a quick-change chuck according to the invention in the released position of the adjusting nut.

Referring to the drawings, the quick-change chuck according to the invention comprises a hollow cylindrical shank 1 into which a tool socket 2 may be inserted which is adapted to receive a tool (not shown) and to be adjusted to different positions in the axial direction of the shank by an adjusting nut 4 which is screwed upon the front end of this socket. This adjusting nut 4 has a neck portion 5 of a smaller diameter in which an annular groove 10 is provided into which a plurality of locking balls are adapted to engage which are guided in radial bores in the front end of shank 1. Over the front part of shank 1 a control sleeve 3 is slipped which is acted upon by a compression spring 7 the rear end of which abuts against a supporting ring 8 which is rigidly secured to the inner side of the control sleeve 3, while its front end acts upon a pressure ring 9 which is inserted into and slidable within the control sleeve 3.

Near its front end, the control sleeve 3 is provided with an inner annular groove 16 and an inwardly tapering wall surface extending from this groove to the end surface of sleeve 3.

Before the adjusting nut 4 together with tool socket 2 is inserted into shank 1, the control sleeve is held by the action of the compression spring 7 in its forward position, as shown in FIG. 1, in which the locking balls project from their guide bores in shank 1 into the annular groove 16 in control sleeve 3. When nut 4 together with tool socket 2 is then inserted into shank 1 so far that the peripheral groove 10 of nut 4 is in alignment with the guide bores in the front end of shank 1, and if the control sleeve 3 is then also retracted, the locking balls 6 will slide out of groove 16 and along the inner conical wall surface of the front end of control sleeve 3 and will thereby be pressed radially inwards within their guide bores in shank 1 so that these balls will then project into the peripheral groove 10 in the neck portion 5 of the adjusting nut 4 and thereby lock the latter to the shank 1.

In order to enable the operator of the machine tool to carry out all manipulations of the chuck of inserting, locking, releasing and withdrawing the tool socket 2 and its adjusting nut 4 with only one hand, the present invention provides the front part of shank 1 with at least one pair of diametrically opposite longitudinal grooves 11 in each of which a connecting bar 12 is provided with a transverse slidable. Each of these connecting bars 12 is provided with a transverse projection 13 and with a longitudinal extension 14 extending at a right angle to the projection 13. The transverse projection 13 projects radially from each connecting bar 12 and between an internal shoulder on the control sleeve 3 and the pressure ring 9, while the longitudinal extension 14 is adapted to engage upon the inner end surface of the adjusting nut 4.

Figure 2:
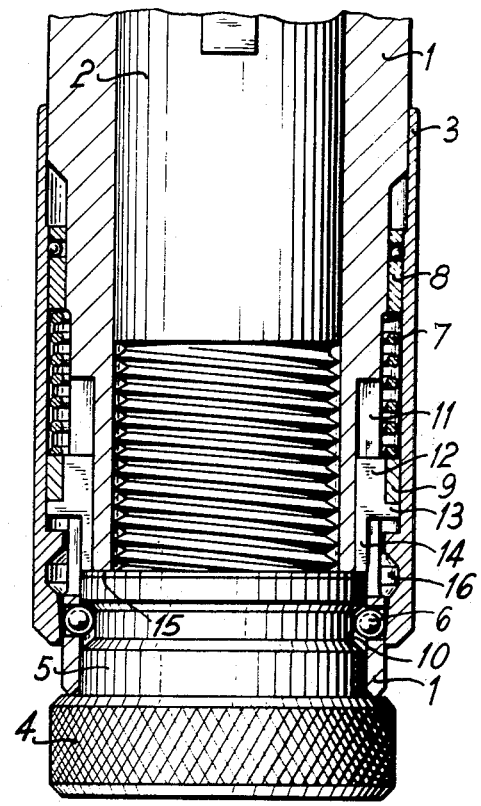
FIG. 2 shows a longitudinal section of the same chuck in the locked position of the adjusting nut.
Figure 3:
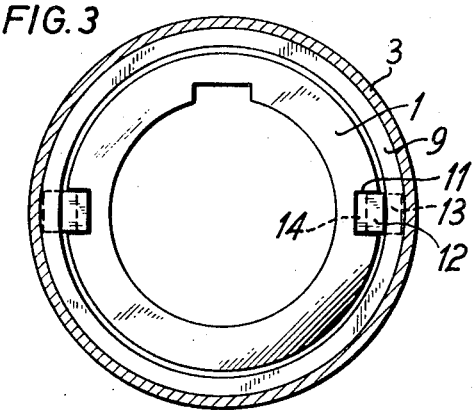
Figure 4:
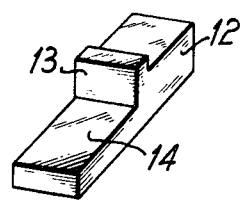
FIG. 4 shows an enlarged perspective view of a connecting bar according to FIGS. 1 to 3.

When the tool socket 2 together with the adjusting nut 4 thereon is inserted into the shank 1 to the position as shown in FIG. 1, the inner end surface of nut 4 will engage upon the longitudinal extensions 14 of the connecting bars 12 and, at the further inward movement of nut 4, it will shift these bars 12 toward the rear so that, by means of the transverse projections 13 and pressure ring 9, the compression spring 7 will be compressed which, in turn, will act upon the supporting ring 8 which is rigidly secured to control sleeve 3, so that the control sleeve will be shifted toward the rear to the position as shown in FIG. 2. During this movement of control sleeve 3, the adjusting nut 4 is shifted so far inwardly that its peripheral groove 10 is substantially in alignment with the guide bores in shank 1, while at the same time the inner conical surface of the end portion of the rearwardly moving control sleeve 3 will press against the locking balls and push the same radially inwards so as to project from their guide bores in shank 1 into the peripheral groove 10 of the adjusting nut 4 so that the latter is locked against any longitudinal movement relative to shank 1. When the adjusting nut 4 is in this position, its inner end surface also abuts against an annular shoulder 15 of shank 1. The entire operation of inserting the tool socket 2 with its adjusting nut 4 into shank 1 and of locking the nut to the shank may therefore now be carried out with one hand merely by pushing the nut so far inwardly that it abuts against the shoulder 15. During this time, the operator may therefore use his other hand for any other purpose, for example, for operating other parts of the machine tool. When spring 7 has pushed the control sleeve 3 to its rear position, its remaining tension will not be sufficient to push the control sleeve without manual assistance again to its forward position in which its annular groove 16 would be in alignment with the guide bores for the locking balls in shank 1.

If the adjusting nut 4 together with tool socket 2 is to be withdrawn from shank 1, it is only necessary to grip the control sleeve 3 with one hand and to slide it forwardly along shank 1 from its position as shown in FIG. 2 to the position as shown in FIG. 1. The compression spring 7 is thereby again compressed until the control sleeve 3 is shifted to the position in which its annular groove 16 is substantially in alignment with groove 10 of the adjusting nut 4. When the control sleeve is in this position, spring 7 will suddenly expand and act as an ejector by pressing via the pressure ring 9 and the connecting bars 12 upon the inner end of the adjusting nut 4. The inclined rear flank of groove 10 then pushes the locking balls 6 radially outwards and out of this groove and into the groove 16 of the control sleeve 3. The further expansion of spring 7 then causes the adjusting nut to be pushed at least partly out of shank 1. The operator may then take his hand off the control sleeve 3 and grip with the same hand the adjusting nut 4 so as to pull the same together with the tool socket 2 out of the shank 1. During this entire unlocking and withdrawing operation the operator may therefore use his other hand again for any other purpose.

Aside from transmitting the inward or rearward movement of the adjusting nut 4 via the pressure ring 9 and spring 7 to the control sleeve 3 or the forward movement of the control sleeve 3 via spring 7 and pressure ring 9 to the adjusting nut 4, the connecting bars 12 have the following additional function: As long as the adjusting nut 4 is not inserted into the shank 1, the initial tension of spring 7 acting via the pressure ring 9 upon the connecting bars 12 presses the latter forwardly so that the longitudinal extensions 14 thereof cover the inner ends of the guide bores in the front part of shank 1. Since the locking balls 6 then project from these guide bores into groove 16, they also prevent the control sleeve 3 from being shifted in its longitudinal direction relative to the shank 1 until the adjusting nut 4 is inserted into the latter and shifts the connecting bars 12 toward the rear.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. In a quick-change chuck comprising a hollow cylindrical shank, a tool socket adapted to be inserted into said shank and to hold a tool, an adjusting nut adapted to be screwed upon the threaded front end of said socket for adjusting the same to different positions in the longitudinal direction of said shank, said adjusting nut having a peripheral groove, locking balls guided in transverse bores in the shank or in a part secured to said shank, and a control sleeve surrounding and slidable along said shank and adapted by a movement in one direction to press said locking balls radially inwards so as partly to project from said guide bores into said peripheral groove of said nut to lock the latter to said shank and, by a movement in the opposite direction, to release said locking balls from said nut so as to permit said nut together with said tool socket to be withdrawn from said shank, the improvement comprising a plurality of connecting bars, the outer wall of said shank which is surrounded by said control sleeve having a plurality of longitudinal grooves spaced at equal peripheral distances from each other and each of said grooves having one of said connecting bars longitudinally slidable therein, said connecting bars being adapted to connect said adjusting nut to said control sleeve for transmitting from one of these elements to the other the longitudinal rearward movement which is manually exerted upon said adjusting nut for locking said adjusting nut to said shank, said connecting bars being further adapted to connect said control sleeve to said adjusting nut for transmitting from one of these elements to the other longitudinal forward movement which is manually exerted upon said control sleeve for releasing said adjusting nut from said shank.

2. A quick-change chuck as defined in claim 1, in which each of said connecting bars has a projection extending radially outwards from said bar and a longitudinal extension at a right angle to said projection having a front end surface engaging upon the rear end surface of said adjusting nut, a compression spring extending longitudinally between said shank and said control sleeve and having one end engaging upon said projection and another end engaging upon said control sleeve so that, when said adjusting nut after being inserted into the open front end of said shank is manually pushed toward the rear of said shank, it presses against said front end surface of said extension of each of said connecting bars and moves the same toward the rear whereby said projections on said connecting bars compress said spring and said spring, in turn, then shifts said control sleeve toward the rear along said shank and said control sleeve thereby presses said locking balls radially inwards in said guide bores so as to engage into said peripheral groove of said adjusting nut to lock said nut to said shank.

3. A quick-change chuck as defined in claim 2, in which, when said control sleeve is shifted manually forwards from its rear position, its movement is transmitted by said spring to said projections on said connecting bars, whereby said extensions on said bars press against said adjusting nut so that, when said control sleeve has been shifted forwardly to the position in which said locking balls are released from said peripheral groove and when said control sleeve is then moved further forwardly, said connecting bars push said nut beyond said position toward and out of the open front end of said shank.

4. A quick-change chuck as defined in claim 3, in which, when said control sleeve is shifted forwardly and said locking balls are released from said peripheral groove, at least two of said locking balls are disposed substantially radially opposite to said extensions within said control sleeve and are prevented by said extensions from moving radially inwards when said adjusting nut is removed, said locking balls then also preventing said control sleeve from moving further forwardly relative to said shank.

* * * * *